United States Patent [19]
Jelley

[11] 3,894,207
[45] July 8, 1975

[54] HAND GRIP TYPE VEHICLE DIRECTIONAL SIGNAL CONTROL SWITCH

[76] Inventor: James E. Jelley, Rt. 4, Box 1224, Gresham, Oreg. 97030

[22] Filed: July 5, 1973

[21] Appl. No.: 376,823

[52] U.S. Cl. ............................... 200/157; 200/61.85
[51] Int. Cl. ....................... H01h 21/24; H01h 9/06
[58] Field of Search ........ 200/6 R, 6 BA, 6 BB, 6 C, 200/11 R, 11 K, 61.27, 61.28, 61.39, 61.54, 61.57, 61.85–61.88, 153 L, 153 LA, 155 R, 155 A, 157, 172 R, 172 A, 172 B, 329–340; 74/551.9

[56] References Cited
UNITED STATES PATENTS

| | | | |
|---|---|---|---|
| 1,564,818 | 12/1925 | Benjamin | 200/157 X |
| 1,837,634 | 12/1931 | Stackhouse et al. | 200/157 X |
| 2,225,936 | 12/1940 | Williams | 200/60 X |
| 2,519,215 | 8/1950 | Appleton et al. | 200/155 A UX |
| 2,806,101 | 9/1957 | Gardes | 200/61.54 |
| 3,259,709 | 7/1966 | Hemmens | 200/11 R X |
| 3,375,381 | 3/1968 | Tavel | 200/157 X |
| 3,511,943 | 5/1970 | Kibler | 200/61.27 X |
| 3,770,926 | 11/1973 | Wanner | 200/172 R X |

*Primary Examiner*—James R. Scott
*Attorney, Agent, or Firm*—Francis Swanson

[57] ABSTRACT

The present invention relates to vehicle directional signal controls for vehicles of the type steered with handle bars. The control is for electrically operated signals and is self-cancelling. The entire control and switch mechanism is mounted within the handlebar and includes a plurality of cams, one of which is spring loaded and floats. Twisting of the handlebar grip connects the electrical power source to the proper signal which is automatically cancelled upon release of the grip.

8 Claims, 4 Drawing Figures

PATENTED JUL 8 1975

3,894,207

(PRIOR ART ILLUSTRATION)

HAND GRIP TYPE VEHICLE DIRECTIONAL SIGNAL CONTROL SWITCH

BACKGROUND OF THE INVENTION

1. Field of the Invention

The present invention relates to vehicle directional signal controls and more particularly to self-cancelling controls for use with vehicles steered by handle bars.

2. Description of the Prior Art

In handle bar equipped vehicles such as motorcycles, bicycles, snow-mobiles, and small three-wheeled scooters, directional controls are usually mounted on the handle bars in the form of a switch. Such switches have three positions — signal-left, off and signal-right. Before turning, the operator must select the position of the switch and after turning manually return the switch to the off position. Some such switches contain warning devices such as buzzers to alert the operator to the fact that though he has completed his turn, the turn signal still flashes. Such devices are actuated by the operator's thumb, usually by moving the switch from the off position to signal-left or to signal-right then back to off. Such switches are bulky in size and are usually fastened to the upper portion of the handle bar.

SUMMARY OF THE INVENTION

It is a paramount object of the present invention to provide a self-cancelling directional signal control for vehicles having handle bar steering.

A further object of the invention is to provide a control which is conveniently located for the operator and actuated by wrist action.

A further object of the invention is to provide a directional signal control which is contained within the body of the handle bar.

Further objects and advantages of the invention will become apparent to one skilled in the art by reference to the drawings and specification which follow.

DESCRIPTION OF THE ILLUSTRATIVE EMBODIMENT

Figure 1:
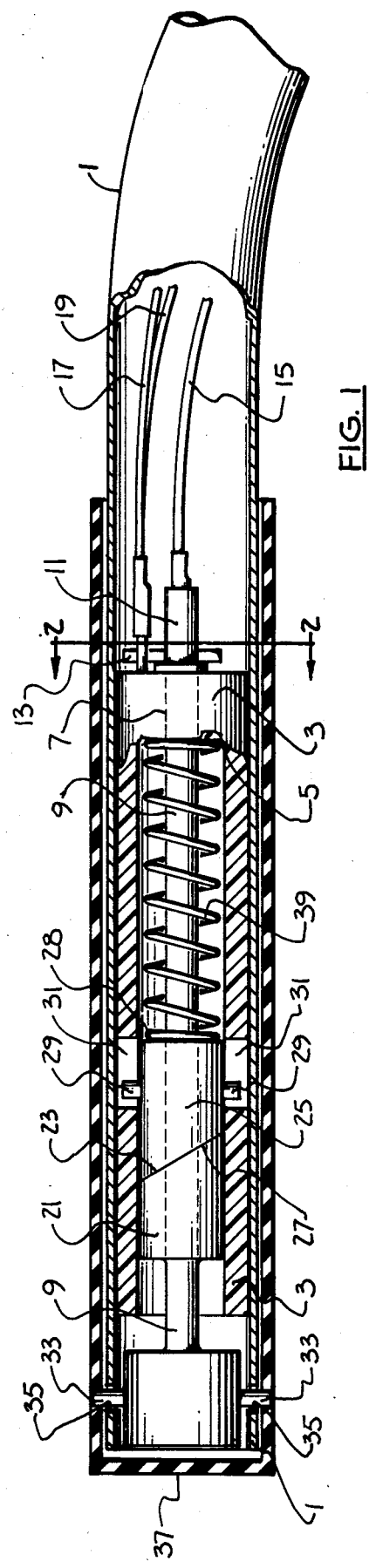
FIG. 1 is a sectional view showing the directional signal control mounted within a vehicle handle bar.
Figure 3:
FIG. 3 is merely an illustration of a typical prior art signal control.
Figure 2:
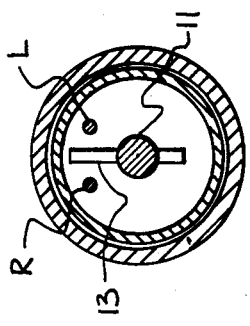
FIG. 2 is a cross-sectional view taken at line 2—2 of FIG. 1.
Figure 4:
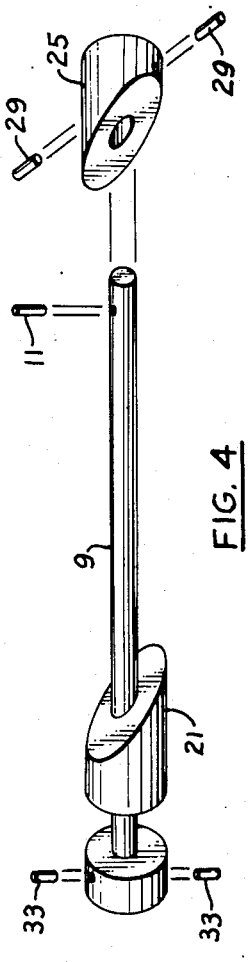
FIG. 4 is an exploded view of the rotating shaft and sliding cam. Related parts are also shown.

Referring now to the drawings, FIG. 1 shows a vehicle handle bar (1). The signal control device comprises a hollow body (3) which is made of nonmetallic material such as nylon or rubber. The body (3) has a shoulder (5) at one end which defines a hole (7) therein. A shaft (9) having a small cylindrical end (11) fits rotatably within the body (3) and protrudes through hole (7). An electrical contact pin (13) is fixed to the protruding end (11) of the shaft (9). An electrical wire (15) connects the electrical system (not shown) of the vehicle to the protruding end (11) of the shaft (9). Contact pins (L, R) are mounted in body (3) and are attached to leads (17, 19) which run to the signal lights for signalling left-turn or right-turn. The first cam (21) having sloped face (23) is fixed upon shaft (9). A second cam (25) having a sloped face (27) is mounted on shaft (9) in sliding relation so that it can float relative to the fixed cam (21). Floating cam (25) has a pair of guide pins (29) protruding at right angles to its longitudinal axis. These guide pins protrude into longitudinal slots (31) in the body (3). Mounting pins (33) are attached to shaft (9) at its outer end and protrude through annular grooves (35) in handle bar (1). These mounting pins are in turn fixedly attached to the outer handle grip (37). A load spring (39) is interposed between the flat face (28) of the floating cam (25) and the shoulder (5) of the body (3).

OPERATION OF THE SIGNAL DEVICE

When the operator wishes to make a turn he merely twists the grip (37) in the direction he wishes to turn. The grip 37 will rotate about the longitudinal axis of bar (1). Since shaft (9) is pinned to the grip (37), it too will rotate and move cam faces (23 and 27) out of face to face contact. By this action fixed cam (21) forces floating cam (25) to slide along the longitudinal axis of the shaft (9) and compresses load spring (39). At the same time, contact pin (13) comes in contact with signal pin (L or R) completing the electrical circuit and causing the appropriate turn signal light to blink. Throughout the turn, the operator holds the grip in this position. When the turn is completed the operator merely releases the grip (37). Load spring (39) then forces floating cam (25) to slide backward along the longitudinal axis of shaft (9). This action causes shaft (9) to rotate and brings cam faces (23 and 27) back into face to face contact. Fixed cam (21) and floating cam (25) are now in their original positions. To turn in the opposite direction, the operator merely reverses the above sequence.

Although a preferred form of the invention has been illustrated and that form described in detail, it will be apparent to those skilled in the art that various modifications may be made therein without departing from the spirit of the invention or from the scope of the appended claims.

I claim:

1. A vehicle directional control mounted within a steering handlebar carried upon a vehicle comprising:

an elongate hollow body;

means defining a longitudinal slot within the wall of the body;

an electrical contact on the body operatively connected to a signal light;

a rotatable shaft contained at least partly within the body and having an electrical contact pin thereon;

a source of electrical power upon the vehicle and having a terminal within the handlebar which is operatively connected to the electrical contact pin on the rotatable shaft;

a first cam fixed on the rotatable shaft;

a second cam slideably mounted on the rotatable shaft and having an ear projecting into the longitudinal slot in the body; position defining means including a spring interposed between the slideable cam and one end of the hollow body which defines a signal-off position of the control;

and a grip attached to the rotatable shaft for applying a torque to the shaft to rotate the shaft within the hollow body thereby coupling the electrical power source to the directional light on the body electrical contact via the shaft mounted contact pin, the positioning means being operable to automatically restore the control to the signal-off position when torque forces applied to the grip are released.

2. Apparatus according to claim 1 wherein said first cam has one slope relative to its longitudinal axis.

3. Apparatus according to claim 1 wherein said second cam has one sloped face relative to its longitudinal axis.

4. Apparatus according to claim 1 wherein the first and second cam each have a sloped face and maintain opposed face to face contact relative to all positions assumed by the rotatable shaft.

5. A self-cancelling directional signal control having an on and off position, the control mounted within a vehicle having a handlebar and comprising:
a body defining a cylindrical cavity;
an elongate rotatable shaft normally biased to an off position mounted within said cavity and including an electrical contact bar on one end of said shaft;
a source of electrical power mounted on the said vehicle and having a terminal within the handlebar, the terminal being operatively connected to said contact bar;
a fixed electrical contact mounted on said body defining an on position;
a grip connected to the rotatable shaft whereby application of a torque force to said grip rotates said shaft into the on position;
and plural cam means within said cavity to automatically return said shaft to the off position, when the torque forces applied to the grip are released.

6. Apparatus according to claim 5 wherein the plural cam means comprises:
a pair of opposed cams having mated sloped faces, the cams mounted on the rotatable shaft and the sloped faces of the cams being held in mating relation by a spring interposed between one cam and the inner end of the hollow body.

7. Apparatus according to claim 8 wherein one of the cams is slideably mounted on the rotatable shaft and includes an ear which slides within a longitudinal slot defined by the wall of the body.

8. A directional signal control mounted upon a vehicle having a handle-bar, the control comprising;
an elongate hollow body mounted at least partially within the handle-bar;
an electrical contact on the body operatively connected to a directional signal light;
a source of electrical power mounted upon a vehicle and having a terminal within the handlebar;
a rotatable shaft mounted within the body including a pin operatively connected to the electrical power source terminal to selectively connect the electrical power source to the directional light electrical contact on the body;
means for manually applying a torque to the rotatable shaft whereby such rotation connects the electrical power source to the electrical contact on the body;
and means within the hollow body to automatically disconnect the electrical power source from the electrical contact when such applied torque is released, the means including a first cam fixed on the shaft; a second cam slideable on the shaft;
the first and second cam each having a sloped face relative to the longitudinal axis of the rotatable shaft, the sloped faces of the cams being in continuous contact throughout rotation of the shaft.

* * * * *